(12) United States Patent
Bates et al.

(10) Patent No.: US 8,343,562 B2
(45) Date of Patent: Jan. 1, 2013

(54) HIGH ENERGY ULTRASOUND EXTRACTION METHOD AND APPARATUS

(75) Inventors: Darren M. Bates, Twin Waters (AU); Arthur R. McLoughlin, Panorama (AU); Andrew Sin Ju Yap, Gawler (AU)

(73) Assignee: Cavitus Pty Ltd, Crafers (AU)

( * ) Notice: Subject to any disclaimer, the term of this patent is extended or adjusted under 35 U.S.C. 154(b) by 656 days.

(21) Appl. No.: 12/520,062

(22) PCT Filed: Dec. 18, 2007

(86) PCT No.: PCT/AU2007/001958
§ 371 (c)(1),
(2), (4) Date: Aug. 24, 2009

(87) PCT Pub. No.: WO2008/074072
PCT Pub. Date: Jun. 26, 2008

(65) Prior Publication Data
US 2010/0015302 A1    Jan. 21, 2010

(30) Foreign Application Priority Data
Dec. 18, 2006    (AU) ................................ 2006907033

(51) Int. Cl.
*A23L 1/025* (2006.01)
*B01J 19/10* (2006.01)
(52) U.S. Cl. ........ 426/238; 426/478; 426/481; 426/482; 426/483; 426/484; 426/485; 241/5; 241/2; 241/14; 241/21; 241/29; 204/158.2; 422/128; 99/510
(58) Field of Classification Search ................... 426/238, 426/478, 479, 481, 482, 483, 484, 485; 241/5, 241/2, 14, 21, 29; 204/158.2; 422/128; 99/510
See application file for complete search history.

(56) References Cited

U.S. PATENT DOCUMENTS

| | | | |
|---|---|---|---|
| 4,603,115 A * | 7/1986 | Schweighardt | 436/178 |
| 5,859,236 A | 1/1999 | Burkart | |
| 5,918,819 A * | 7/1999 | Rabinovich et al. | 241/5 |
| 7,101,691 B2 | 9/2006 | Kinley et al. | |
| 7,439,654 B2 * | 10/2008 | McDermott et al. | 310/323.19 |
| 7,604,126 B2 * | 10/2009 | Patist et al. | 209/164 |
| 7,744,923 B2 * | 6/2010 | Rajewski et al. | 424/489 |
| 2006/0204624 A1 | 9/2006 | Patist et al. | |

FOREIGN PATENT DOCUMENTS

| | | |
|---|---|---|
| DE | 4416785 A1 | 11/1995 |
| DE | 19842998 A1 | 4/2000 |

(Continued)

OTHER PUBLICATIONS

English translation for DE 10164274 published Jul. 2003.*
Vilkhu, et. al., Applications and opportunities for ultrasound assisted extraction in the food industry—A Review. Innovative Food Science & Emerging Technologies, Oct. 16, 2006, pp. 161-169, col. 9, issue 2.

*Primary Examiner* — Anthony Weier
(74) *Attorney, Agent, or Firm* — Honigman Miller Schwartz and Cohn LLP; Thomas A. Wootton; Jonathan P. O'Brien (57) ABSTRACT

The present invention describes a method and apparatus for aqueous extraction of chemical compounds from solid material in which the solid material is entrained in an extraction liquid phase that flowed around immersed sonotrodes emitting radial or focused high energy ultrasonic waves. A significant increase in extracted material and decreases in extraction time is observed.

21 Claims, 9 Drawing Sheets

FOREIGN PATENT DOCUMENTS

| | | | |
|---|---|---|---|
| DE | 10164274 | * | 7/2003 |
| DE | 10164274 | A1 | 7/2003 |
| EP | 0583200 | A1 | 2/1994 |
| RU | 2104733 | C1 | 2/1998 |

* cited by examiner

HIGH ENERGY ULTRASOUND EXTRACTION METHOD AND APPARATUS

FIELD OF THE INVENTION

This application is a U.S. national phase application of PCT/AU2007/001958 filed Dec. 18, 2007, which claims the benefit of the Australian Provisional application No. 2006907033, filed on Dec. 18, 2006. Both of these documents are incorporated herein in their entirety.

DESCRIPTION OF THE PRIOR ART

The wooden barrel has historically occupied an important place as a general container for liquids and foodstuffs. However, the development of methods of materials handling, and of other construction materials more practical under modern conditions, has replaced the barrel almost completely, except for wine and spirit aging.

Wines and spirits stored in oak barrels acquire attractive and desirable sensory characteristics, complexity and sensory qualities. Because of this, the production of many fine red and white table wines involves the use of oak barrels. Most barrels used for wine maturation around the world are between 190 and 500 liters in capacity. For table wine, a size of about 225 liters is the most common.

Oakwood comprises cellulose, hemicellulose, tannins and lignins—the last 3 influencing wine during contact in wood. Hemicellulose (non-odorous) do so indirectly—heating staves transform them chemically, thus becoming a base for other odor compounds. Tannins (non-volatile) liberated from wood are hydrolyzable and composed of polymers of ellagic and gallic acids. Amounts in wine after storage in barrels can be up to 100 mg/L. The soluble lignins are partially degraded into aromatic aldehydes, which can form the corresponding phenolics acids by oxidation. The contribution of new oak barrels depends mainly on the extraction of the volatile phenolics (over 200 identified) fraction of the wood components.

Important compounds entering wine by simple diffusion are cis and trans-b-methyl octalactoned which have a coconut-like aroma—by far the most important organoleptically (oak lactones can be modified to a more caramel-like note by furfural); aldehydes (particularly vanillin); phenolics ketones which augment the vanillin aroma; other volatile phenolics ketones; volatile phenols, such as eugenol (spicy, clove and carnation aromas); guaiacol and its derivatives (smoky and medicinal); furanic derivatives derived from toasting, and a range of other compounds; and Nor-isoprenoids (about 30, including B-ionone)

Toasting increases (i) the amounts of guaiacol (smoky and medicinal), 4-methyl guaiacol (smoky and clove-like), vanillin (vanilla), syringaldehyde, coniferaldehyde, sinapaldehyde and oak lactones (woody and coconut-like) in wine, and (ii) polysaccharides in oak (about 50%) give rise to furfural, maltol and cyclotene, which impart a sweet and toasty aroma.

American oak contains more oak lactones and nor-isoprenoid constituents than French oak.

In a new hogshead (300 L) about 11 g of oak is extracted per mm of wine penetration into the wood. The first mm is penetrated in about 1 week. Based on barrel surface area per liter of wine, for each mm that wine penetrates into the barrel it extracts about 7.6 g of wood extract for a 200 L barrel and 5.6 g for a 500 L barrel.

A new 225 L barrel can contribute 3.8 g of wood extraction at a depth of penetration of 0.5 mm in about 2 months. Based on tasting results this is about 3 to 10 times the amount needed to produce a testable difference in wine. Over a lengthy period of time, penetration of up to 6 mm may occur.

This represents extraction of up to 46 g of wood in a 225 L barrel. This gives about 100 times the min detectable level of flavouring for most wines, or the barrel could be filled and emptied 100 times and detectably flavour all of that wine.

Diffusion of oak components into wine will change somewhat as the surface becomes exhausted, as large molecules will take longer to diffuse. However, a molecule capable of diffusing through the semi-permeable wood system will eventually be extracted, and it is not surprising that even after long and continual use of a barrel it may still contribute detectable oak flavours to wine stored in it for sufficient time.

Traditionally the only way a wine would ever pick up wood character was through contact in an oak barrel or tank. But the increasing cost associated with the purchase of an oak barrel in past 10 years, economically minded winemakers, wishing to maintain the oak advantage, are switching to oak alternatives, oak replacements or oak options. Oak alternatives are practically anything in oak, which is not coopered. The terminology for the lo various options depends on the supplier, but the basic choices include staves and inserts of many lengths and toast levels, blocks, cubes, "dominoes," chips, shavings, chains of oak bars and oak powder. The quality of oak is the same as for oak barrels, but the cost is not.

Aqueous and chemical extraction of valuable components such as oils, flavourings, pigments, pharmaceutical or nutritional compounds from materials is widely practiced. The speed and yields of such processes have an important influence on the cost of production.

Agricultural production releases a large amount of waste that is found to contain a significant amount of high value components and dietary fibre, which are valuable substances. Extraction of high value components from food products could provide an additional income for producers. Conventional extraction has a number of problems including high organic chemical consumption, long operating time and low yield.

There have been some attempts to improve the extraction process for some materials by utilizing ultrasonic vibrations to facilitate the contact between the material and the extraction agent.

European patent 583200 discloses a method of extracting evening primrose oil in an extraction column attached to which are ultrasonic transducers.

In U.S. Pat. No. 5,859,236 there is disclosed an extraction process for microcrystalline cellulose in which the extracted liquor is subjected to ultrasonic agitation.

These prior patents demonstrate that low power ultrasonic technology producing wave vibrations assisted extraction in a small batch environment. However, the low power ultrasonic technology could not be used in a continuous flow process. In this case, the ultrasonic energy density is to low, the ultrasonic residence time is short and the volume/production speed is high.

Also, the technology used in existing patents could not be used without breakdown, overheating, power overload, on a mobile fluid or medium because the electrical/electronic design specification of the generator and transducers were not designed to treat mobile fluids with changing physical and chemical conditions (flow rate, pressure, temperature, gas entrainment, vapour pressure of liquid, surface tension are examples). Low power ultrasound was designed only for small batch volumes, which were static (none mobile). The experience of using low power ultrasound has been that the cost effectiveness has not been commercially attractive or technically/economically viable.

OBJECT OF THE INVENTION

It is an object of the present invention to provide a method of extracting chemical components from material with greater efficiency than has otherwise been possible.

It is an object of the present invention to overcome, or at least substantially ameliorate, the disadvantages and shortcomings of the prior art.

Other objects and advantages of the present invention will become apparent from the following description, taking in connection with the accompanying drawings, wherein, by way of illustration and example, an embodiment of the present invention is disclosed.

SUMMARY OF THE INVENTION

According to the present invention, although this should not be seen as limiting the invention in any way, there is provided a method of aqueous extraction of chemical compounds from material in which the material entrained in an extraction liquid phase is flowed around immersed sonotrodes emitting radial or focused ultrasonic waves into the oak fluid medium at energy intensities in the range of 0.01 to 1000 W/cm$^3$ (or 0.01 to 1000 W/cm$^2$) but most preferentially the process will work effectively between 0.1 and 100 W/cm$^3$ or 0.1 to 100 W/cm$^2$.

The high-energy waves create high energy cavitation, mechanical shock waves, micro streaming, high energy vibration and high energy pressure waves in the processed medium.

The use of sonotrodes immersed in the liquid phase increases the penetration of the ultrasonic waves into the interior of the material. This contrasts with the prior art where transducers were clamped/bolted/welded to the outside of steel vessels/chambers. This effect creates low energy, low efficiency standing/stationary waves in the liquid allowing for only outer surface extraction and only if the residence time is very long (>1 hour). The energy intensity associated with standing/stationary vibration waves is only in the region 0.0001 Watt/cm$^3$.

Further the prior art was often limited to batch treatment and not continuous flow through extraction.

The use of high intensity ultrasonic radial waves or focused energy produces microstreaming effects/cavitational effects on the surface and into the structure of the oak material to remove/dislodge components and to enhance aqueous penetration. In contrast prior ultrasonic methods which use the concept of transducers clamped/bolted/welded to the outside of steel vessels/chambers created low energy, low efficiency standing/stationary waves in the material which does not produce microstreaming effects to enhance aqueous penetration and component removal. In contrast, the introduction of high intensity sonotrodes into the liquid stream produces intensities of between 0.01-1000 W/cm$^3$ allowing for high velocity microstreaming effects (780 km/hr), enhanced aqueous penetration and component removal.

The present invention uses low frequency ultrasound (16 kHz-100 kHz) for the extraction of substances from material with the preferred frequency being between 20 and 30 kHz. A wide range of substances can be extracted using the method of the present invention including, but not limited to, colouring, flavourings and neutraceutical compounds existing within the material.

The ultrasonic frequency and the sonotrode design and the flow through cell design needs to be adapted for the material to be extracted. The extent of the organic load and type of structure of the material will determine the type of sonotrode design. The design of a specific sonotrode will allow for greater penetration of the ultrasonic wave/cavitational energy, better coupling of energy to the product and improved energy efficiency resulting in greater extraction of components, aqueous penetration and dislodgment of components from the material being extracted.

In preference, the present invention can be applied to include the extraction of colour and flavour compounds from grape skin, extraction of anthracyanins from grape skin, anti oxidants from grape seed using aqueous solvent, organic solvent or a combination of the two.

By way of example, an oak process with low organic loading or products with a strong absorption factor of ultrasonic energy would use a cascade design radial sonotrode. In contrast, a process with a high organic load or a low ultrasonic absorption coefficient would use a radial sonotrode having an increased diameter to length (wavelength) factor/ratio producing ultrasonic waves which have a greater distance of propagation and have a greater capacity to penetrate through a product stream with a high organic loading or a product with a low ultrasonic absorption coefficient. Prior art devices using transducers welded/bolted to the outside of vessels/chambers/tubes were not designed for specific types of organic load or products with different ultrasonic absorption characteristics.

Increased performance of aqueous penetration and extraction of components is achieved by using an automatic frequency scanning system for different types of product. For example, in extracting compounds from oak, the greater the organic load (concentration, viscosity), the more the type of oak surface/tissue/structure will determine the resonance frequency of that system/oak product. The ultrasonic resonance frequency is the frequency at which the ultrasonic unit will deliver the greatest energy efficiency.

This invention also provides an ultrasonic system, which locks onto the resonance frequency of a specific product and then re-scans for the new resonance frequency every 0.001 second throughout the treatment process. Without resonance frequency tracking a variation as little as 10 Hz from the resonance frequency would result in a drop in energy efficiency in the order of 10-40%. This would have a significant reduced effect on the aqueous penetration, extraction of components and dislodgment of components.

By way of example, the resonance frequency of lettuce is 20,350 Hz where as carrot will have a resonance frequency of 20,210 Hz. Prior art devices using transducers welded/bolted to the outside of vessels/chambers/tubes were not designed with an automatic resonance frequency tracking system for specific types of oak products so products could not be processed at the correct resonance frequency and maximum power efficiency.

It is preferred to use high power and high amplitude ultrasound (0.001 W/cm$^2$-1000 W/cm$^2$) and 1-micron displacement-500-micron displacement (the preferred amplitude range would be 20-60 microns) for the extraction. Prior art devices were unable to produce this kind of energy and amplitude level.

The present invention is particularly useful in enhancing water as a solvent for the extraction of components from oak products. The use of high power, energy efficient focused and radial systems producing high velocity microstreaming, high-energy cavitation enables the penetration of water through a hydrophobic surface and into the tissue/structure of the oak material to remove/dislodge components.

Thus using the system of the present invention organic solvents can be replaced wholly or partly with water and reduce the safety concerns that arise from the use of solvents such as hexane.

However, this invention could also be applied to the use of ultrasonics in combination with a mixture of water and organic solvent (e.g. water and ethanol) or an organic solvent alone (e.g. alcohol, hexane, acetone) for the extraction of compounds from products such as oak products. The use of low frequency ultrasound could also be combined with supercritical fluids (e.g. liquid $CO_2$) under high pressure for the extraction of components and compounds from oak materials.

The ultrasonic transducer could be attached to an existing high pressure vessel containing super critical liquid.

Another aspect of this invention is to use low frequency/high intensity ultrasound in combination with mild heat (0° C.-60° C.) to extract components, compounds from oak products. The synergistic effect between ultrasonic energy and thermal energy enhances extraction kinetics and extraction yield.

Another aspect of this invention is to use low frequency/high intensity ultrasound in combination with pressure (0.5 to 10 bar pressure but preferentially between 2 and 4bar) to extract components, compounds from oak products. This synergistic effect between ultrasonic energy and pressure greatly enhances the coupling and impedance matching of the ultrasonic waves to the medium particularly when the fluid contains high solids content. The improved coupling of the waves to the product improves extraction kinetics and extraction yield In the preferred equipment design, this present invention relates to the use of radial sonotrodes, which emit high-energy ultrasonic waves. However, other sonotrodes could be used such as high amplitude focused sonotrodes, which produce high concentration of localized cavitation bubbles around the sonotrode surface.

The sonotrode and flow cell arrangements in accordance with the present invention are based on using radial sonotrodes immersed in a liquid phase and capable of being tuned to frequencies in the range of 16 kHz-100 kHz and produce energy intensities of between 0.01 to 1000 W/cm$^3$.

One arrangement includes Radial sonotrodes fitted longitudinally or laterally within an open tank, trough or flume. Reflector shields are arranged at the base to reflect and or focus ultrasonic energy into the product flow path.

Another suitable arrangement utilizes focused or radial sonotrodes fitted in a flow through cell where the water/oak product flows either directly into the face or across the face of the sonotrode. Residence time can be controlled by regulating the micro-streaming flow from the sonotrode, the flow rate, the power and size of a transducer/sonotrode, the number of transducer sonotrodes in series and parallel and vessel geometry.

The invention relates to high power ultrasonic extraction of compounds from oak based materials, however the technology as described above could also be applied to other horticultural/agricultural based materials (fruit, vegetables, cereals, grass, seeds by way of example) for the extraction of neutraceutical, anti-oxidant, oils, flavourings, colorants, bioactive compounds, food materials.

In preference, the invention includes super critical fluids/extraction technology (such as liquid $C0_2$) to enhance yield and process kinetics.

BRIEF DESCRIPTION OF THE DRAWINGS

By way of example, an employment of the invention is described more fully hereinafter with reference to the accompanying drawings, in which.

DETAILED DESCRIPTION OF THE INVENTION

The systems of this invention include a power source, a transducer converting electric energy into mechanical vibrational energy, which is transmitted into the liquid extraction phase system by a sonotrode 5. The sonotrode 5 can provide either radial wave, stationary wave or focused emission, depending on the application. The sonotrode material may be made of titanium or ceramic, steel, cast alloy, or glass.

The transducer system could be PZT (piezo ceramic transducer), Terfenol-D magnetostrictive transducer or a Nickel-Iron-Vanadium magnetostrictive material.

As could now well be appreciated, the immersed sonotrodes 5 of the current invention could be used when conveyers are used to transport produce. In addition the current invention could also be a cascade sonotrode for use in low organic liquids and a radial sonotrode with a greater diameter to length ration for improved penetration in high organic loaded liquids.

Figure 1:
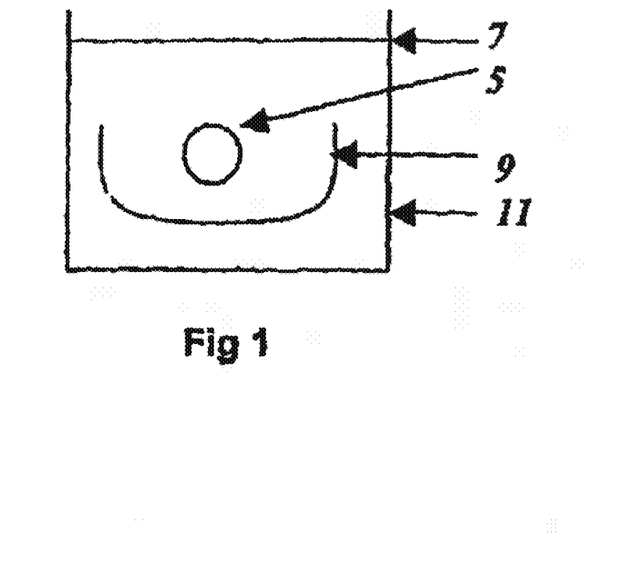
FIG. 1 shows a radial sonotrodes of the present invention fitted longitudinally in a channel.

Application of ultrasonics range (10 kHz to 100 kHz), intensity (0.01 W/cm$^3$-1000 W/cm$^3$) and amplitude (1 micron displacement-500 micron displacement). The transducers/power supply can have an individual power ranging from 100 Watts-16000 Watts. The power supplies preferably include automatic resonance frequency tracking so that when the equipment is running during the extraction process, the unit is also always scanning the new resonance frequency (relates to maximum power output) due to changes in the liquid stream 12. The sonotrodes/transducers can be mounted or retrofitted to tanks, vessels (round, square, oval), troughs, pipes, flowcells 10 containing the solid material entrained in the flow 12 of the liquid extraction phase. FIG. 1 shows the sonotrode 5 immersed in the liquid extraction phase 7, with a reflector 9 in a channel 11.

Moreover, the invention as described can also be combined with super critical fluids/extraction technology to enhance yield and process kinetics—such as liquid $CO_2$. A transducer could be incorporated on the outer shell of the extraction tube so that the extraction tube becomes the sonotrode. The ultrasonic waves are then produced inside the super critical extraction tube where the super critical solvent and solid substrate is located. Alternatively, the ultrasonic sonotrode could be connected via a flange internally inside the super critical extraction tube where it is exposed directly to the solid substrate and the super critical fluid.

The ultrasonic waves and cavitation produced aid solvent mass transfer of the super critical fluid into the solid substrate. Examples of this application are the extraction of gingerol from ginger.

As could not be readily appreciated to those skilled in the art, the above invention could also be readily applied to extraction of tea solids, colour, flavour and polyphenols from tea leaves—aqueous extraction, extraction of caffeine from coffee, extraction of coffee, flavour, colour from whole and ground roasted coffee beans—aqueous extraction, extraction of antioxidants, neutraceuticals, bio actives and carotenoids from agricultural products such as fruit, fruit pulp, fruit skin, Extraction from vegetables, vegetable pulp, vegetable skins and nuts—example of this would be lycopene from tomato pulp or skin, alpha and beta carroteine from carrot pulp and skin, citrus oil from the peel of citrus fruit such as orange, grapefruit, lime, lemon. This could be aqueous or solvent such as ethanol or a combination of aqueous and solvent, extraction of oils from agricultural products such as fruit, fruit pulp, fruit skin.

Extraction of corn oil from corn or corn germ, soya beans, olives, canola seeds, palm plants and palm fruit/fibre, rose oil from plant/petal materials. This could be aqueous or solvent such as ethanol, hexane, butane or a combination of aqueous and solvent.

Extraction of flavours from agricultural products including fruit, vegetable and nuts such as chocolate from cocoa beans, extraction of protein from meat, extraction of renin from dairy products, extraction of sugar from sugar beat or sugar cane, extraction of starch from corn, soya, wheat, (and other agricultural materials) and from the fibres of those materials, extraction of juice from fruit and vegetable based materials.

EXAMPLES

Oak Flavour Extraction 40 g of oak was extracted using 150 ml of either tap water or 12% ethanol/water or 100% ethanol. The samples were stirred (control samples) or sonicated for 10 and 30 seconds after which a liquid sample was taken for sieving (ca. 0.8 mm mesh) followed by filtration with number 1 Whatman filter paper. A sub-sample of filtrate was diluted 3.5× with water and sent for oak flavour analysis by GC-MS at The Australian Wine Research Institute.

Results

The limit of quantification (μg/L in the diluted extract) for the identified chemicals by GC-MS were: guaiacol 3.5, eugenol 35, oak lactone 35, vanillin 35 and furfural 35. Other chemicals which were analyzed but were below the limit of quantification were: 4-methylguaiacol, 4-ethylphenol, 4-ethylguaiacol and 5-methylguaiacol.

The extraction data shows that sonication using the above methodology increases the extraction of desired compounds compared to the control samples for the same extraction time.

Figure 5:
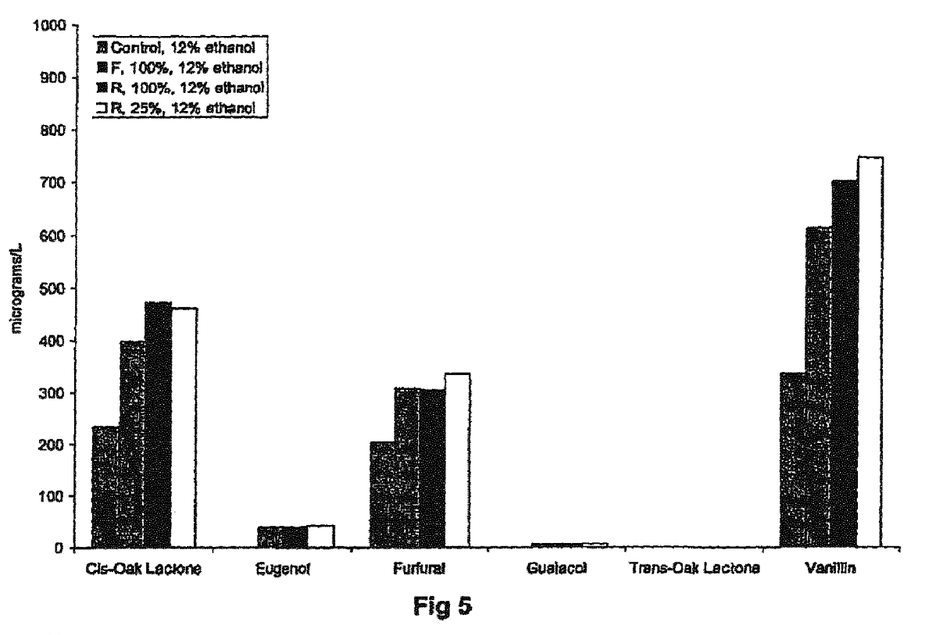
FIG. 5 shows the results of the present invention on extraction of compounds from oak material, 10 seconds in water.
Figure 6:
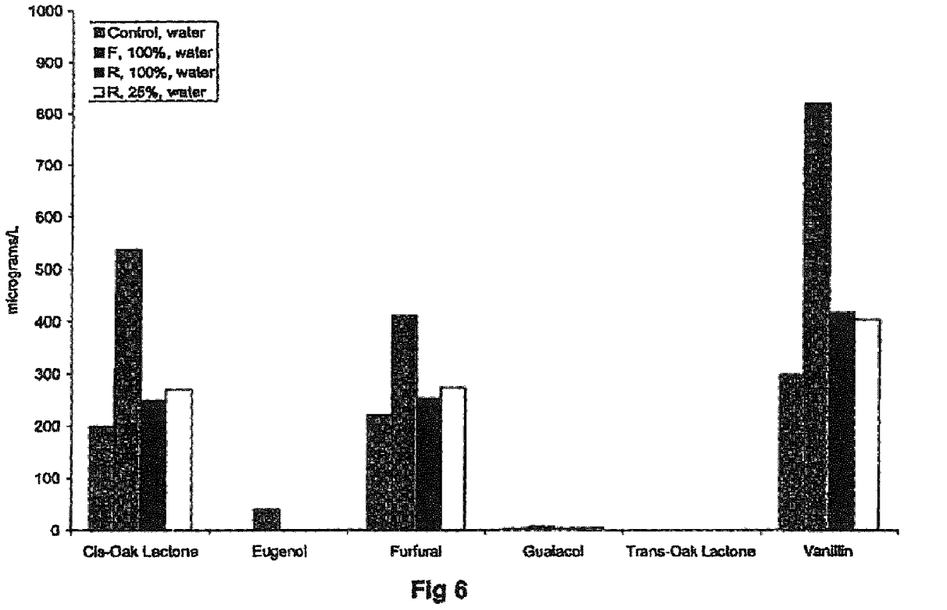
FIG. 6 shows the results of the present invention on extraction of compounds from oak material, 30 seconds in water.
Figure 7:
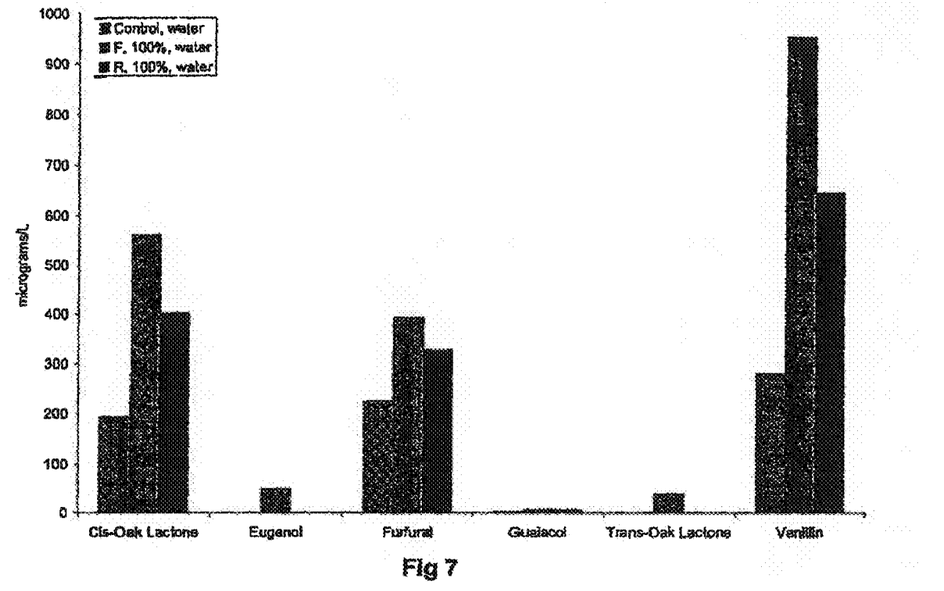
FIG. 7 shows the results of the present invention on extraction of compounds from oak material, 10 seconds in 12% ethanol/water.

In radial mode 12% ethanol (FIG. 5) was most effective, whereas in focused mode water (FIGS. 6 and 7) was most effective.

From the above results sonication significantly increased the extraction of oak flavours as measured by GC-MS of the oak flavours. In focused mode water was most effective, whereas in 12% ethanol radial and focussed were similar in effectiveness. Reducing the amplitude to 25% also did not make a significant reduction in the extraction of the flavour chemicals.

Extraction of colour (anthocyanin) from red table grapes using different sonication methods and durations.

Ten extractions were performed; each used 150 ml of deionized water and peeled skins from 20 red table grapes. The control samples were stirred for 10, 60 and 120 seconds after which a liquid sample was taken for pH analysis followed by colour measurements with a UV-visible spectrometer. The sonicated samples were of the same time periods (10, 60 and 120 seconds) at 100% amplitude and one sample at 30% amplitude for 60 seconds. The sonicator was operated in either focused or radial modes. See Table 1 for the different experimental combinations. The control samples were adjusted to pH 4.3 to be inline with the sonicated samples which varied from 4.3 to 4.5. All samples were measured for colour without filtration and after filtration with 0.2 ppm syringe filters.

Results

Figure 8:
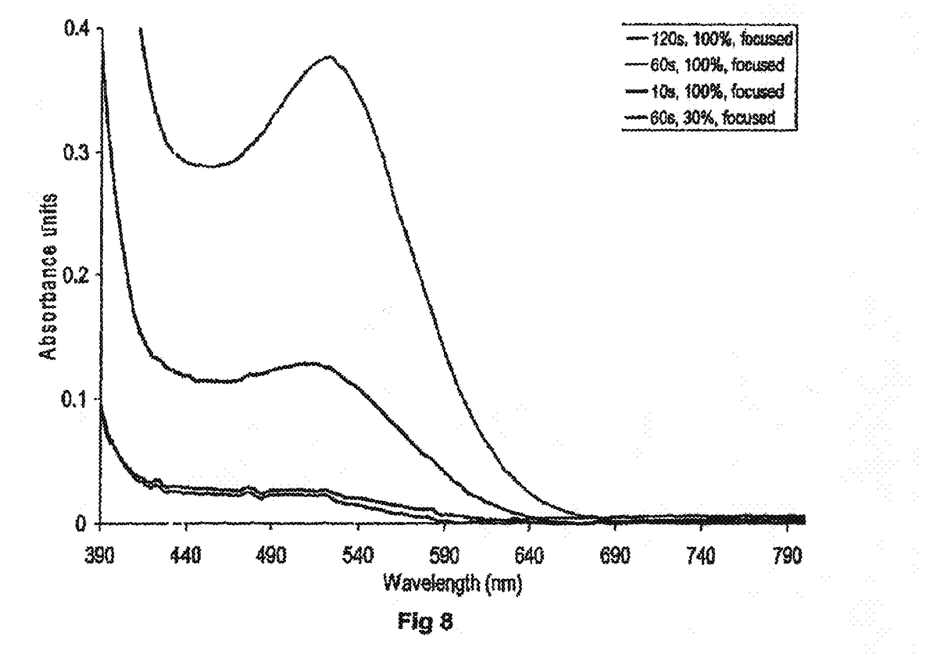
FIG. 8 shows the colour spectra of the extracted table grapes with different sonication times at 100% and 30% amplitude, focused.
Figure 9:
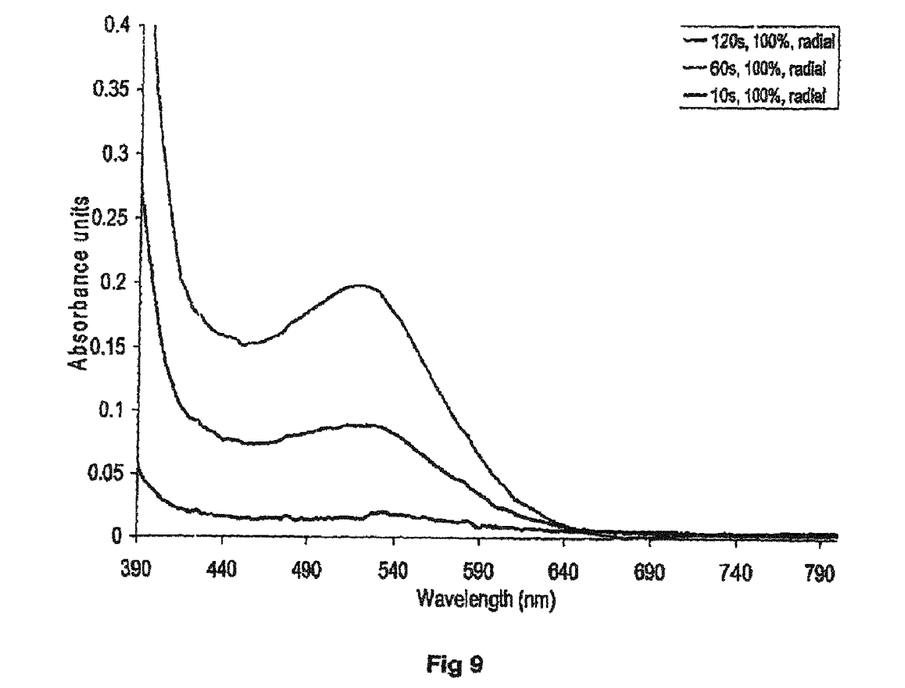
FIG. 9 shows the colour spectra of the extracted table grapes with different sonication times at 100% amplitude, radial.
Figure 10:
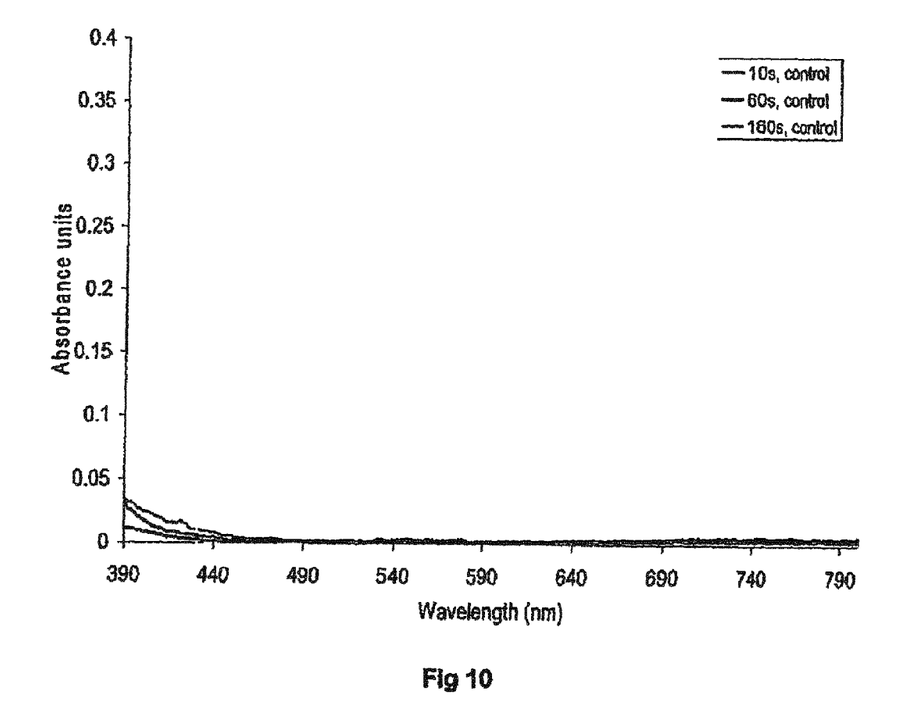
FIG. 10 shows the control group; colour spectra of the extracted table grapes which were stirred for different time periods.

Colour intensity increases with increased extraction time, measured by the absorbance of light at a specific wavelength, see Table 1, FIGS. 8-10 and 11 of both the controls (stirred) and sonicated samples. FIGS. 8 and 9 are on the same x- and y-axis scale and it is clear from the comparison that the focused mode extracts more colour than the radial mode. The summation of the absorbance at the wavelengths 420 and 520 nm is defined as the colour intensity of the extract, as is typically measured in the wine industry. This is shown in FIG. 11b, whereas the individual absorbances at each wavelength are shown in FIG. 11a. It is clear that sonication greatly increases the extraction of anthocyanins and therefore the colour intensity.

TABLE 1

| Extraction time: | 10 | 60 | 120 |
| --- | --- | --- | --- |
| Radial 100% 420 nm | 0.0196 | 0.0942 | 0.1832 |
| Radial 100% 520 nm | 0.0148 | 0.0884 | 0.198 |
| Focused 100% 420 nm | 0.033 | 0.1356 | 0.3368 |
| Focused 100% 520 nm | 0.0264 | 0.1254 | 0.376 |
| Control 420 nm | 0.004 | 0.0076 | 0.0152 |
| Control 520 nm | 0.002 | 0.002 | 0.002 |
| Focused 30% 420 nm | | 0.0296 | |
| Focused 30% 520 nm | | 0.0224 | |

Increasing the duration of sonication from 60 to 120 seconds resulted in a greater than 2-fold increase in absorbance.

Figure 12:
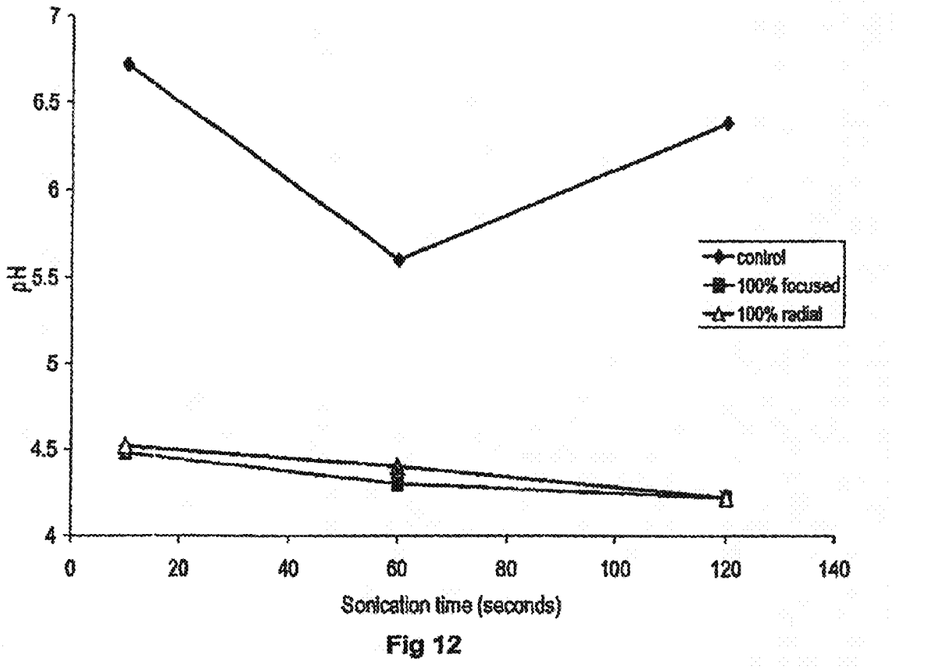
FIG. 12 shows pH of the extractions of FIGS. 8-10 after different sonication times.

FIG. 12 shows the pH of the samples. The pH slightly decreased with increased sonication time, probably as a result of the release of acids from the fruit and skins. The absorbance without modifying the pH of the controls did not make a significant difference, probably as the amount of the anthocyanin present was at the limit of detection of the instrument.

Conclusion

Figure 11A:
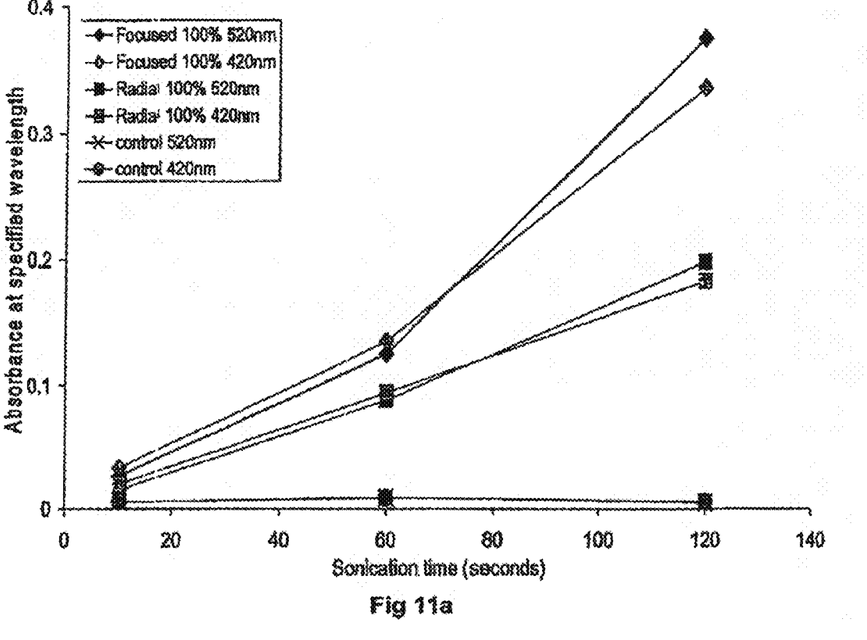
FIGS. 11a and 11b, Colour absorbance at the two standard wavelengths used for colour analysis for quality control in the wine industry. 11b represents the colour intensity, the summation of the absorbance at each wavelength. Data extracted from FIGS. 8-10.
Figure 11B:
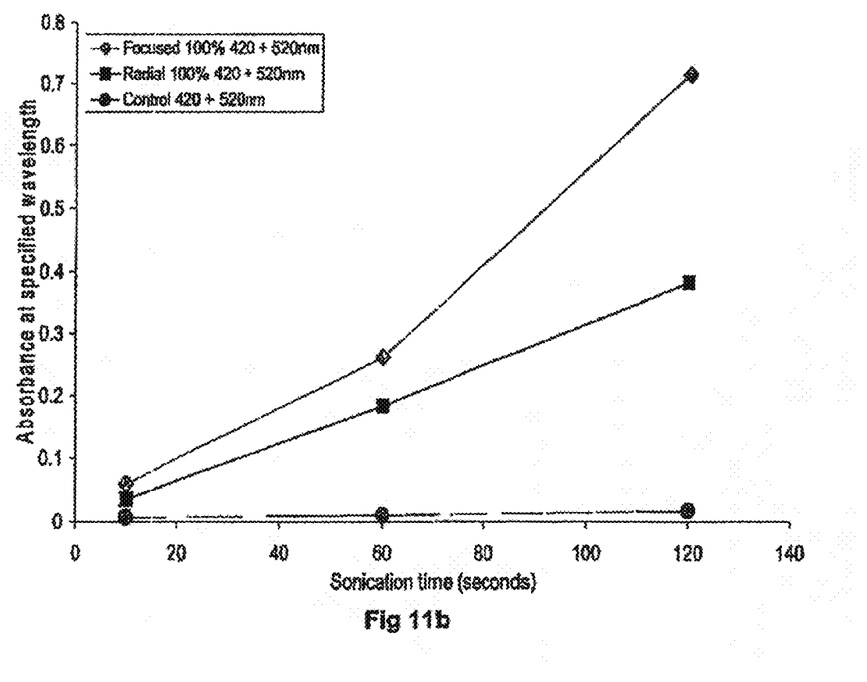

Sonication using the methodology described increases the release of the red colouring chemical, anthocyanins, found in the skins of grapes. Increasing the duration of sonication had a positive effect on the colour intensity (FIG. 11) as did the use of the focused mode. Reduction of the amplitude to 30% had an expected reduction in the extraction.

Extraction of Carotene from Carrots and Limonene from Lemon and Limes

Methodology for the Extraction and Analysis of Carotene

A batch of carrots was blended in a food mixer. 30 g of the blend was suspended in 150 ml of 20% ethanol water solution either by sonication with a 400 W bench too instrument or by mixing by hand (control samples). Variables considered were extraction time: 10, 20 and 30 seconds, focused versus radial sonication mode, and 100% versus 25% amplitude in radial mode. After the extraction the liquid component was immediately removed by sieving with a 08mm pore size stainless steel sieve. An aliquot of the sieved liquid was then filtered using a syringe filter with a pore size of 0.45 µm. This was then diluted 6 times with a 20% ethanol water mix and analysed on a VU-vis spectrometer. The background sample was an aliquot of pure extraction solvent (20% ethanol water mix).

Methodology for the Extraction and Analysis of Limonene from Lemon and Lime

Peelings of each fruit were blended in a food mixer. For lemon, 30 g of the blend was suspended in 150 ml of water either by sonication with a 400 W bench top instrument (manufacturer) or by mixing by hand (control samples). Variables considered were extraction time: 5, 10 and 30 seconds, focused versus radial sonication mode, and 100% versus 25% amplitude in radial mode. For lime 15 g of the blend was suspended in 75 ml of water either by sonication with a 400 W bench top instrument or by mixing by hand (control samples). Variables considered were extraction time: 10 and 30 seconds, focused versus radial sonication mode, and 100% versus 25% amplitude in radial mode. After the extraction of the lemon and lime the liquid component was immediately removed by sieving with a 0.8 mm pore size stainless steel sieve. 10 ml of hexane was added to each liquid sample and vigorously mixed, by hand, for 30 seconds after which they were left to stand until the end of the day. The aqueous component was removed by freezing over night at approx −15° C. and decanting the liquid hexane.

An aliquot of each sample was analyzed on a VU-vis spectrometer with the background sample as hexane.

Results

Figure 13:
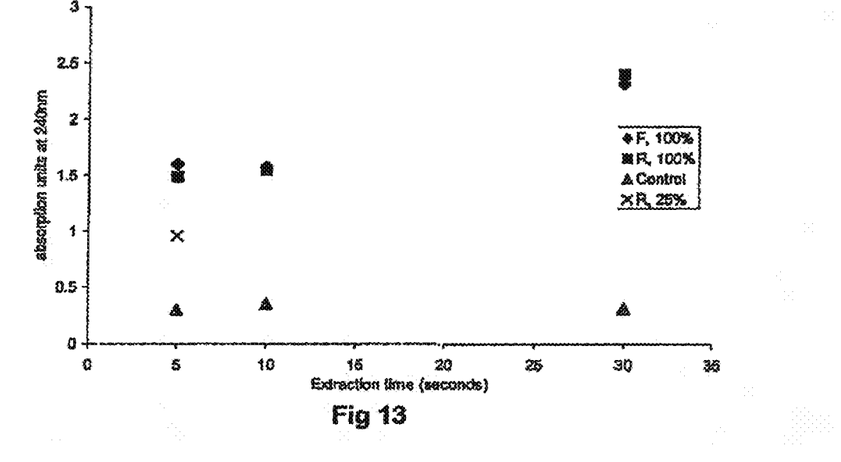
FIG. 13 shows Extraction from lemons for different experimental conditions.
Figure 14:
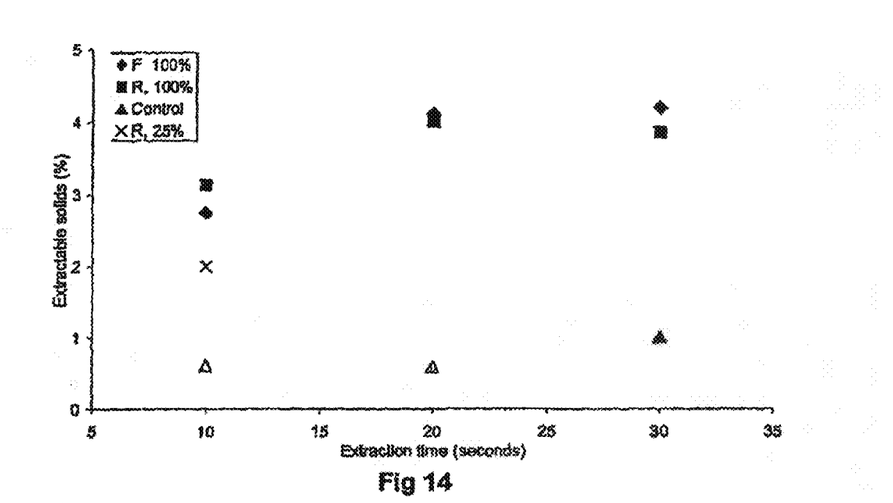
FIG. 14 shows the extractable solids from tea as a wt %. [F=focused, R=radial, 100% and 25%=amplitude]
Figure 15:
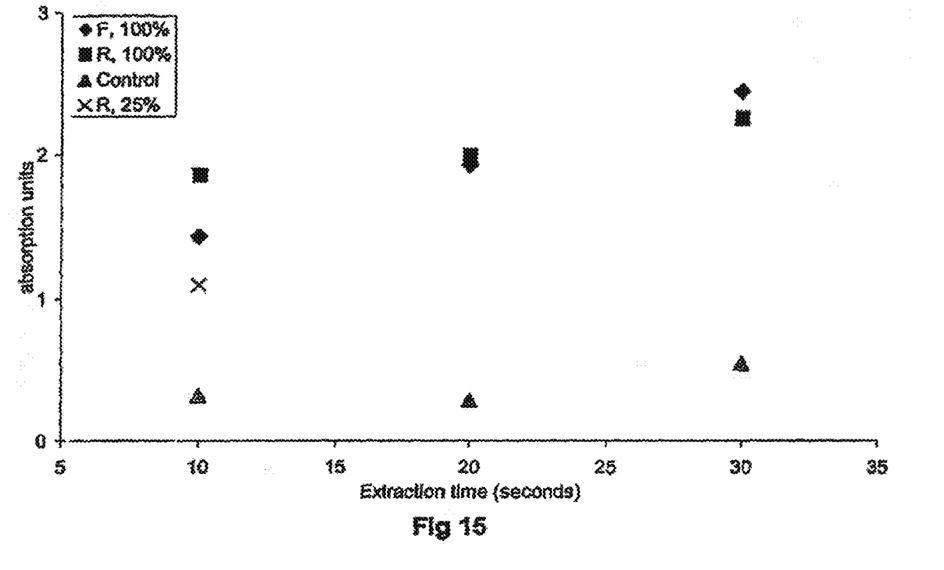
FIG. 15 shows the UV-vis absorbance from extracted tea. [F=focused, R=radial, 100% and 25%=amplitude]
Figure 16:
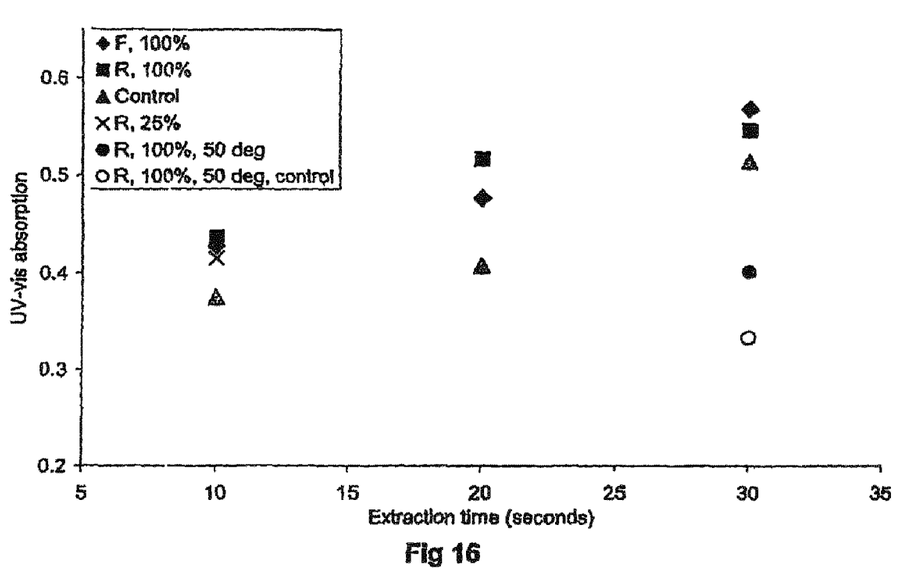
FIG. 16, shows the UV-vis absorbance from extracted coffee. [F=focused, R=radial, 100% and 25%=amplitude]
Figure 17:
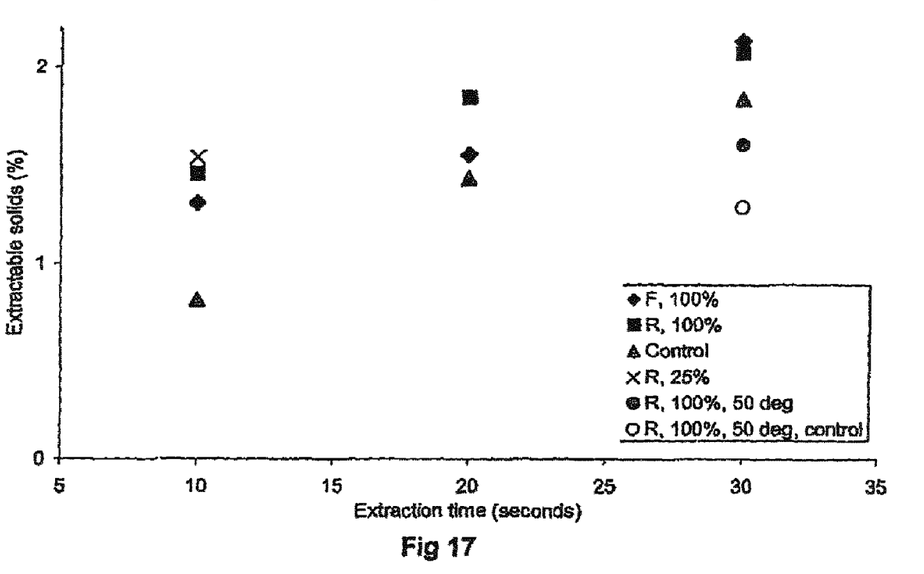
FIG. 17 shows the extraction from oak chips into water and 12% ethanol/water. [F=focussed, R=radial, 100% and 25%=amplitude].

An increased absorption at a specific wavelength indicates the presence of increased analyte. For each wavelength represented in each chart in figure one, each variable (time, sonication mode and amplitude) is depicted. FIG. 13 is a representative example showing the effects of the variables (time, sonication mode and amplitude) upon the extraction from lemon and lime.

The data shows that sonication using the described methodology increases the extraction compared to the control samples for the same extraction time. Increasing the extraction time increases the measured extract for carrot, lemon and lime.

Extraction of tea, coffee and oak.

Methodology for Tea and Coffee

Extractions were performed each using 200 ml of tap water (at 80° C., 2 data points were also done at 50° C. for coffee) and 40 g of tea or coffee. The samples were stirred (control samples) or sonicated for 10, 20 and 30 seconds after which a liquid sample was taken for sieving (ca. 0.8 mm mesh) followed by filtration at 0.45 µm for coffee and 0.2 µm pore size for tea. A sub-sample of filtrate was immediately taken and diluted 10× with 1:1 wt. mix of ethanol/water for tea; and 50× with water for coffee prior to measurements with a UV-visible spectrometer. The remaining filtered sample was weighed and left to dry at 80° C. All extracted samples were weighed before and after drying to allow calculation of extractable solids as a % of extracted liquid/solution.

Methodology for Oak 40 g of oak was extracted using 150 ml of either tap water or 12% ethanol/water. For oak chips only one extraction time was used for the 12% ethanol mix. The samples were stirred (control samples) or sonicated for 10, 20 and 30 seconds after which a liquid sample was taken for sieving (ca. 0.8 mm mesh) followed by filtration with number 1 Whatman filter paper. A sub-sample of filtrate was immediately taken and diluted 5× with either extraction solvents; prior to measurements with a UV-visible spectrometer. A second filtrate sub-sample was diluted 35× with water and sent for oak flavour analysis by GC-MS.

Oak powder used: Medium toast, ca. 1 mm particle size

Oak chips used: Heinrich Cooperage, American Oak Medium. Particle size approx 10-18 mm long, 2-7 mm wide, 1-2 mm thick.

Results and Discussion

Figure 2:
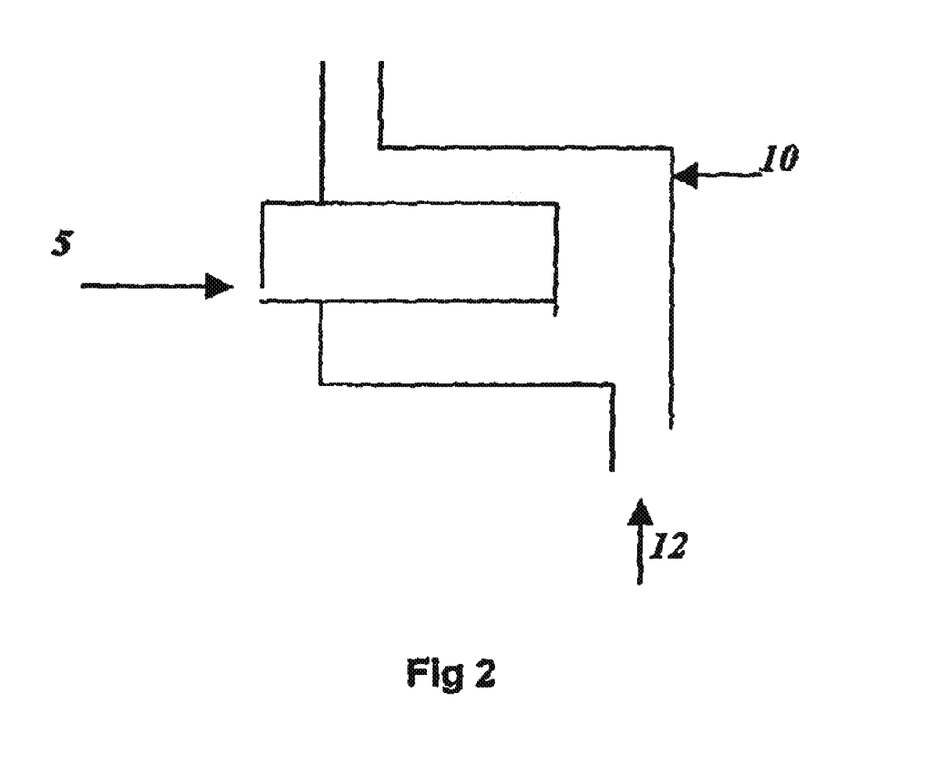
FIG. 2 is shows a lateral sonotrode of the present invention for closed flow through cells.
Figure 3:
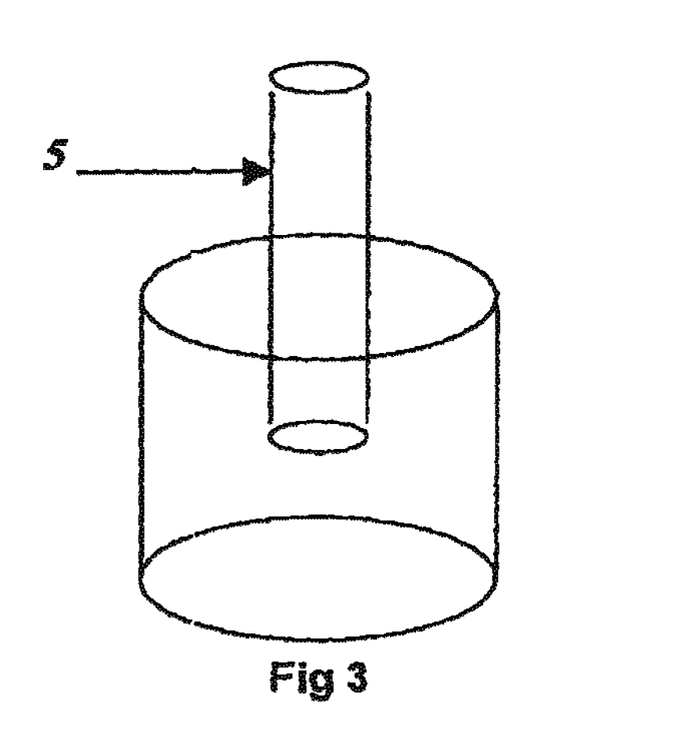
FIG. 3 shows a focused sonotrode of the present invention in a rotating drum extractor.
Figure 4:
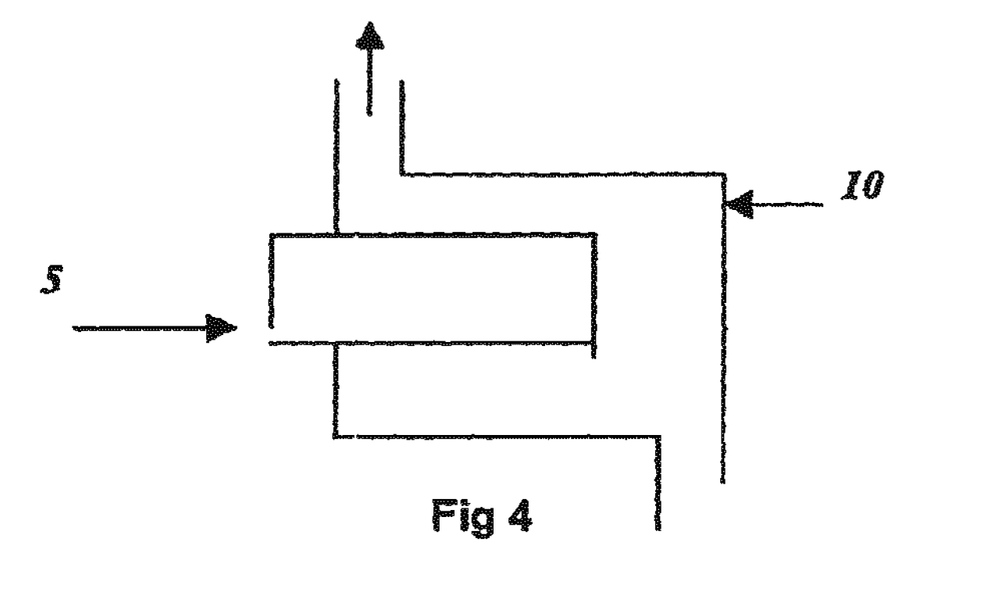
FIG. 4 shows a radial sonotrode of the present invention in a closed flow through cell.

FIGS. 1 and 2 shows the extractable solids (% solids of the solution after filtration) and the UV-vis absorbance at 320 nm wavelength for tea. FIGS. 3 and 4 are for coffee showing the same detail as tea but the spectroscopy was at 350 nm. The oak extraction only shows the UV-vis absorbance at 270 nm.

Results

All the data shows that sonication increases the extraction compared to the control samples for the same extraction time.

Any improvement may be made in part or all of the method steps and systems components. All references, including publications, patent applications, and patents, cited herein are hereby incorporated by reference. The use of any and all examples, or exemplary language (e.g., "such as") provided herein, is intended to illuminate the invention and does not pose a limitation on the scope of the invention unless otherwise claimed. Any statement herein as to the nature or benefits of the invention or of the preferred embodiments is not intended to be limiting, and the appended claims should not be deemed to be limited by such statements. More generally, no language in the specification should be construed as indicating any non-claimed element as being essential to the practice of the invention. This invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contraindicated by context.

We claim:

1. A method of extraction of chemical compounds from horticultural and agricultural based material in which said material is entrained in a liquid extraction phase that is flowed around a sonotrode immersed in the liquid phase, the sonotrode emitting ultrasonic waves radially into the liquid phase at energy intensities between approximately 0.1 and 100 W/cm$^3$, wherein said ultrasonic energy comprises ultrasonic waves with an amplitude of from 20 to 60 microns, and wherein said method further comprises degassing said liquid phase.

2. The method of claim 1, wherein said chemical compound is selected from a neutraceutical, anti-oxidant, oil, flavoring, colorant, bio-active compound or food material.

3. The method of claim 2, wherein the material is a food product.

4. The method of claim 1, wherein the method further includes tuning the sonotrode to lock onto a resonant frequency of the material entrained in the extraction liquid phase.

5. The method of claim 4, wherein the liquid phase is an aqueous liquid.

6. The method of claim 5, wherein the aqueous liquid is water.

7. The method of claim 4, wherein the liquid phase is a supercritical liquid.

8. The method of claim 1, wherein the liquid phase is heated to between 0° C. and 60° C.

9. The method of claim 1, wherein the liquid phase is held under a pressure.

10. The method of claim 9, wherein the pressure is between 0.5 bar to 10 bar.

11. The method of claim 10, wherein the pressure is between 2 bar and 4 bar.

12. The method of claim 4, wherein the food material is selected from the group consisting of fruit, vegetables, cereals, grasses, seeds and mixtures thereof.

13. An apparatus for extracting chemical compounds from horticultural and agricultural based material including an extractor body:
  i. a conduit for directing a flow of liquid extraction phase around the material such that the material is entrained therein;
  ii. at least one ultrasonic generator operatively connected to at least one sonotrode, the sonotrode being adapted for emitting ultrasonic waves radially into the liquid phase at energy intensities between approximately 0.1 and 100 $W/cm^3$ and with an amplitude of from 20 to 60 microns, with at least one sonotrode configured to be in contact with the liquid phase during operation;
  iii. such that the operation of the ultrasonic generator results in ultrasonic energy being radially emitted into the liquid phase, and being thereby applied to horticultural and agricultural based material entrained in the liquid phase, and results in degassing of the liquid phase.

14. The apparatus of claim 13, wherein the sonotrode operatively connected to the ultrasonic generator is tunable to lock onto a resonant frequency of material entrained in the extraction liquid phase.

15. The method of claim 3, wherein the method further includes tuning the sonotrode to lock onto a resonant frequency of the material entrained in the extraction liquid phase.

16. The method of claim 3, wherein the liquid phase is heated to between 0° C. and 60° C.

17. The method of claim 6, wherein the liquid phase is heated to between 0° C. and 60° C.

18. The method of claim 7, wherein the liquid phase is heated to between 0° C. and 60° C.

19. The method of claim 8, wherein the liquid phase is held under a pressure.

20. The method of claim 1, wherein said material is vegetable.

21. The method of claim 20, wherein said material is oil-bearing.

* * * * *